United States Patent [19]

Vize

[11] 4,318,571
[45] Mar. 9, 1982

[54] AUTOMATIC BRAKE CONTROL FOR TILTING OPERATOR CAB

[75] Inventor: Robert M. Vize, Bettendorf, Iowa

[73] Assignee: Caterpillar Tractor Co., Peoria, Ill.

[21] Appl. No.: 137,113

[22] PCT Filed: Feb. 7, 1980

[86] PCT No.: PCT/US80/00130
§ 371 Date: Feb. 7, 1980
§ 102(e) Date: Feb. 7, 1980

[87] PCT Pub. No.: WO81/02334
PCT Pub. Date: Aug. 20, 1981

[51] Int. Cl.³ ............................................. B60T 13/22
[52] U.S. Cl. .................................. 303/71; 180/89.14;
180/286; 188/170; 303/6 M; 303/18
[58] Field of Search .............. 188/152, 166, 167, 109,
188/110, 170; 303/13, 50–54, 1, 2, 18, 19, 71, 6
M; 180/77 TC, 77 N, 77 P, 286, 77 Q, 89.14,
89.11, 89.15

[56] References Cited

U.S. PATENT DOCUMENTS

| | | |
|---|---|---|
| 3,259,203 | 7/1966 | Ryskamp ........................ 188/109 X |
| 3,332,522 | 7/1967 | Dence ................................. 188/109 |
| 3,390,734 | 7/1968 | Sheerin ......................... 180/89.14 X |
| 3,618,692 | 11/1971 | Stikeleather .................... 180/89.14 |
| 3,743,047 | 7/1973 | Dapolito ............................. 180/286 |
| 3,892,294 | 7/1975 | Nieminski ........................... 188/109 |
| 4,053,178 | 10/1977 | York et al. ...................... 180/89.15 |

*Primary Examiner*—Douglas C. Butler
*Attorney, Agent, or Firm*—Wegner, Stellman, McCord, Wiles & Wood

[57] ABSTRACT

A vehicle (10) having an operator's cab (12) which may be tilted to gain access to parts of the vehicle located beneath the cab, has a braking mechanism which automatically brakes the vehicle (10) when the cab (12) is tilted so that maintenance and tests may be conveniently performed on the components under the cab (12) while the engine is running. The mechanism consists of a pedal (34) and a linkage (40,44,48) carried by the cab (12). The linkage includes a lever arm (40), a rod (44) and a lever arm (48) connected to a brake actuating assembly. The pedal (34) and linkage are operated to activate the brake actuating assembly for conventional braking and are carried with the cab (12) during tilting of the cab to automatically activate the brake actuating assembly to set the brakes.

14 Claims, 5 Drawing Figures

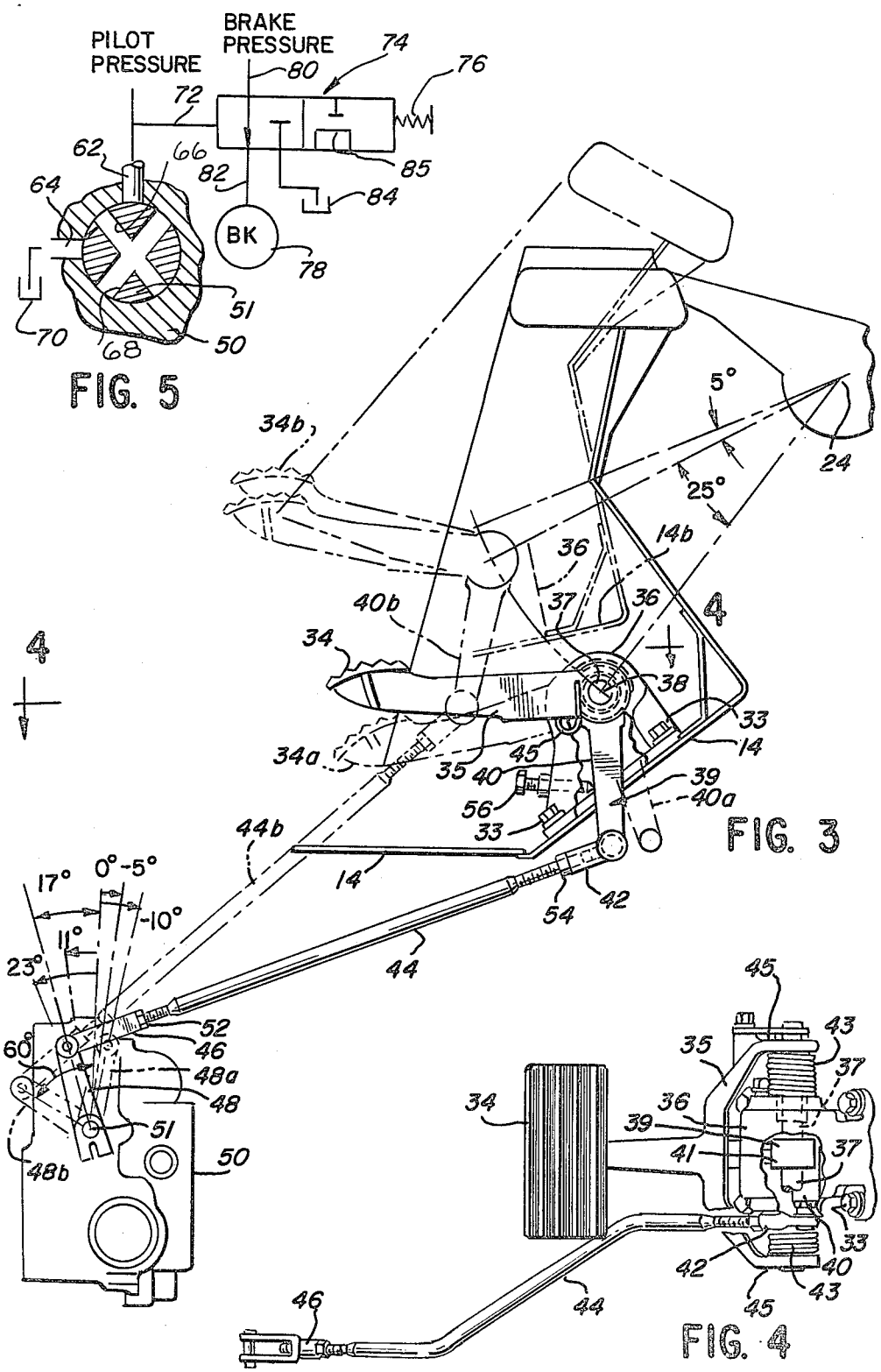

AUTOMATIC BRAKE CONTROL FOR TILTING OPERATOR CAB

TECHNICAL FIELD

This invention relates generally to a braking mechanism for vehicles having a pivoted operator's cab. More particularly, this invention relates to an apparatus for applying the vehicle brakes when the cab is tilted and the engine is either running or not running.

BACKGROUND ART

In certain types of equipment, such as earthmoving vehicles, numerous vehicle components are located beneath the operator's cab. To perform maintenance and tests upon those components, it is desirable to gain access to the area beneath the cab. Thus, U.S. Pat. No. 4,053,178 to York et al, issued Oct. 11, 1977, has disclosed a structure for pivotally mounting the operator's cab on the vehicle frame so that the cab may be relatively easily moved to gain access to the components below the cab.

Some prior vehicles used cables on all of the controls except the brakes. The motion required to operate the brakes dictated the use of a solid linkage, which linkage became non-functional upon tilting the cab. In order to apply the brakes with the cab tilted, it was necessary to disconnect the linkage whereupon a spring applied the brakes.

Several patents, including U.S. Pat. No. 3,259,203 to Ryskamp issued July 5, 1966, U.S. Pat. No. 3,332,522 to Dence issued July 25, 1967, and U.S. Pat. No. 3,892,294 to Nieminski issued July 1, 1975, have disclosed mechanisms which automatically apply a vehicle's brakes when the operator's seat is tilted, such devices being intended to prevent the vehicle from moving when the operator is out of the cab. However, these mechanisms involve use of separate brake actuating systems from those used during vehicle operation, thus requiring costly installation of two separate actuating systems. Further, these mechanisms would not operate automatically upon tilting the entire operator's cab.

The present invention is directed to overcoming one or more problems found to exist in the above equipment.

DISCLOSURE OF INVENTION

In one aspect of the present invention, a brake applying means for a vehicle includes an actuating pedal located in the operator's cab and a brake linkage extending from the actuating pedal to a means for actuating the brakes on the vehicle. The pedal is depressed in a conventional fashion to apply the brakes and, upon releasing pressure on the pedal, the brakes are released. When the cab is tilted, the brake linkage is carried with it and, when moved to a predetermined point and beyond, the brakes are applied. With this feature, access may be gained to the operative parts beneath the operator's cab while the engine is running and while the brakes are applied.

The prior art has developed a means of tilting the operator's cab to gain access to components thereunder, but since the brake could not be engaged during tilting of the cab, it has been difficult to observe and repair these components while the engine is operating. Although certain prior art has developed systems which automatically apply the brakes, these systems have been separate from the brake actuating system used during normal vehicle operation. The present invention uses a single, reliable system which actuates the brakes during both conventional vehicle operation and cab tilting.

A brake pedal is attached to a brake linkage which actuates the means for applying the brakes. During conventional operation, depressing the pedal causes the brake linkage to move the means for applying the brakes to a braking position. When the cab is tilted, the configuration of the brake linkage and the means for applying the brakes is such that the brake applying means is automatically moved to a brake applying position.

BRIEF DESCRIPTION OF THE DRAWINGS

FIG. 3 is a sectional view of the mechanism of the present invention showing the cab and pedal in various positions;

FIG. 4 is a cutaway view of the brake linkage including a foot pedal and a rod; and FIG. 5 is a schematic illustration of a portion of a brake actuating circuit.

BEST MODE FOR CARRYING OUT THE INVENTION

Figure 1:
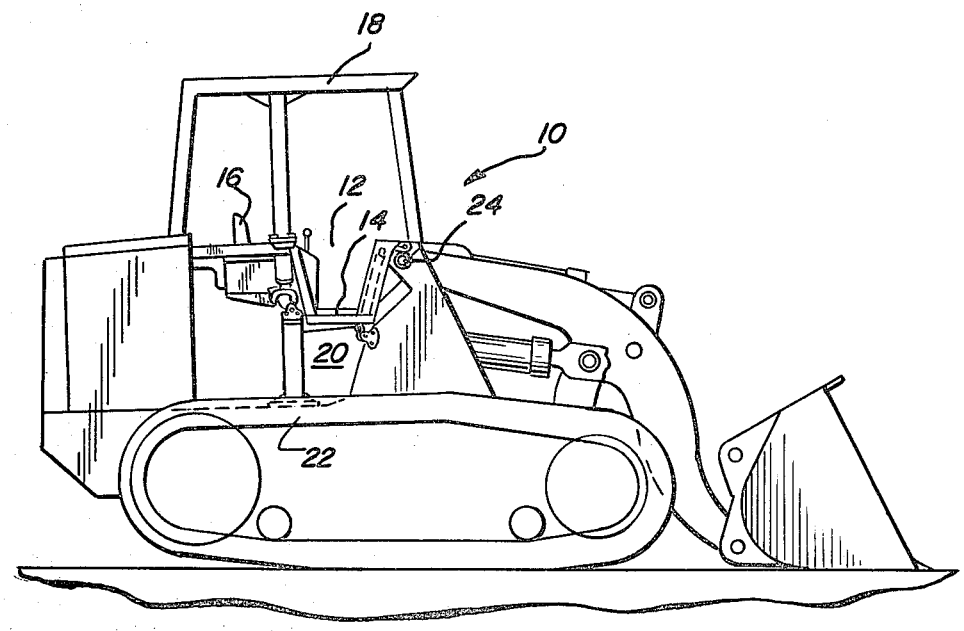
FIG. 1 shows an earthmoving vehicle having a tilting operator's cab in which the present invention may be utilized.

FIG. 1 shows an earthmoving vehicle 10 containing a tilting operator's cab 12 as disclosed in U.S. Pat. No. 4,053,178 to York et al, and assigned to the common assignee of the present application. The cab 12 contains a platform 14 supporting a seat 16 and rollover protection structure 18. Not shown, but located beneath the platform 14 is the area indicated by reference numeral 20 between main frame elements 22, are a large number of hydraulic elements, circuitry and other vehicle components. The operator's cab 12 supported on the platform 14 may be tilted forwardly around a hinge point 24.

Figure 2:
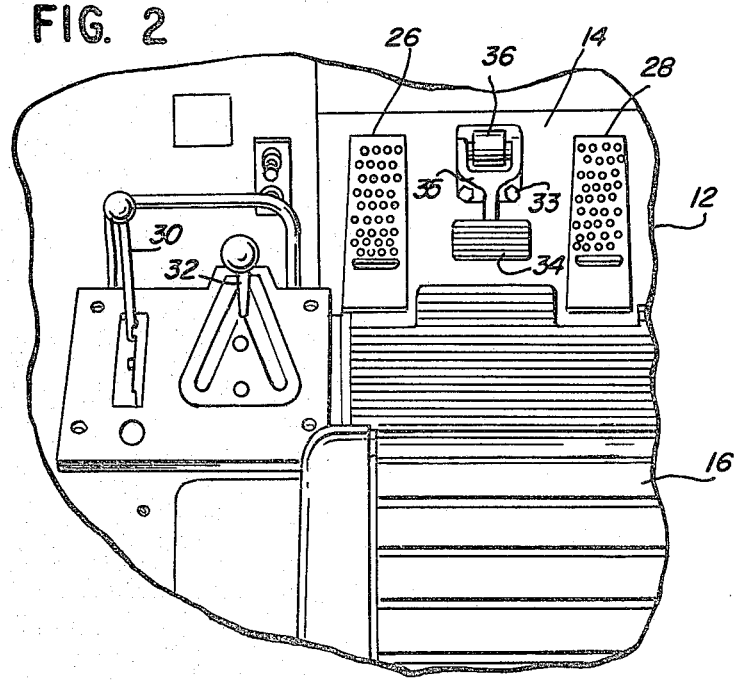
FIG. 2 is a view of the interior of the operator's cab, the view being from a perspective above and near the rear of the cab.

FIG. 2 shows the interior of the operator's cab 12 looking toward the operating controls and the foot pedals. The cab 12 contains two steering pedals 26,28, a governor control 30 and a vehicle speed and direction control lever 32 for operating and controlling the vehicle 10. In the cab 12 between the steering pedals 26,28 is a brake actuating pedal 34. The pedal 34 has a bifurcated mount 35 pivotally mounted on a support 36 which is secured to the platform 14 by bolts 33. The operation of brake actuating pedal 34 may be more clearly seen in FIGS. 3 and 4.

In FIG. 3, the position of the platform 14 and brake linkage, including the brake actuating pedal 34 and rod 44, drawn in solid lines, is the position during normal vehicle operation. The bifurcated mount 35 of the brake pedal 34 pivots about a longitudinal axis 38 of pivot rod 37 extending outwardly from the support 36. A lever 39, shown in FIG. 3 with the side of the support 36 broken away and shown in FIG. 4 with the top of the support 36 broken away, has a base portion 41 and a lever arm 40. The base portion 41 is secured to the rod 36 so as to pivot in unison with pedal 34, mount 35 and rod 37. A pair of coil springs 43 encircle the opposite end portions of the rod 37 with each spring having one end anchored to the support 36 and having the other end shaped in a hook 45 and engaging beneath mount 35 of the pedal 34. The springs 43 are tensioned to apply a clockwise force to the brake pedal 34 (as viewed in FIG. 3).

Pivotally connected to the remote end of the lever arm 40 is a rod end 42 in which the proximal end of rod 44 is received. The distal end of the rod 44 is connected to another rod end 46 which is pivotally connected to a mechanism for actuating the brakes, in the present illustrated form, the rod end 46 is connected to a lever arm 48 on a valve 50. The valve 50 is typically a transmission control unit and senses pressure for control of vehicle speed and directs pilot pressure for brake actuation. Each rod end 42,46 is adjustably connected to the rod 44 by nuts 52,54 so that the effective rod length between the lever arms 40,48 may be adjusted to the proper non-braking condition, as shown in solid lines in FIG. 3. It should be noted that the rod 44 has a substantial offset from one end to the other so that the forces are transmitted from the pedal to the valve 50. The torsion springs 43,43 urge the pedal 34 clockwise until it contacts against an adjustable stop 56 which limits clockwise pivoting of lever 39 and locates the brake pedal 34 in its non-braking position, shown by solid lines.

INDUSTRIAL APPLICABILITY

As installed in a vehicle, one exemplary form of the invention has the lever arm 48 rigidly connected to a multi-purpose valve spool 51 of the valve 50 so that movement of the lever in a plane transverse to the axis of the spool will turn the spool 51 about the longitudinal axis of the spool 51 to modulate the setting of the valve.

In the embodiment illustrated herein, when the brake pedal 34 is in the raised (fully clockwise) position, the brakes are in a released state and the vehicle speed and direction is controlled by the controls 30,32. The apparatus connected to the center foot pedal 34 provides an optional means of controlling the vehicle speed. Depressing the pedal 34 varies the speed independent of the setting of the forward, neutral and reverse lever 32 speed and direction setting. When the pedal 34 is fully depressed through the zero speed range to a vent position, the brakes are applied. The brakes, in one embodiment, are disc brakes on the vehicle final drive gear train and are applied by a plurality of stacked Belleville springs, not shown. The brakes are released by applying hydraulic pressure to compress the Belleville springs thereby releasing the brakes. So that if a hydraulic line ruptures, becomes clogged or leaks or when the engine is shut down, the brakes are applied by the action of the Belleville springs. As shown in FIG. 5, a valve 50 has a passage 62 communicating with pilot pressure and has a passage 64 communicating with a reservoir 70. Valve spool 51 has orifices 66 and 68 which, in one position, will connect pilot pressure in passage 62 with the reservoir 70 through passage 64 and with the valve spool 51 in another position, the spool will block the flow of pilot pressure through the valve 50. With the valve spool 51 in position to block the flow of pilot pressure through valve 50, the pilot pressure is thus directed via a branch line 72 to a valve 74 shifting the valve against its bias spring 76. In this position, fluid from a source (not shown) is directed to the brakes 78 via lines 80 and 82 to compress the Belleville springs thereby releasing the brakes. When the orifices 66,68 are aligned between passages 62 and 64, the pilot pressure is vented to the reservoir 70, the spring 76 moves valve 74 to the left to align bypass orifice 85 between the brake line 82 and reservoir 84 to vent the brake actuator whereupon the brakes are applied.

In one illustrated embodiment, the lever arm 48 of the brake applying means is used to rotate the valve spool 51 in either a clockwise or a counterclockwise direction from a maximum speed setting position. With the operator's foot removed from the pedal 34, the axis of the lever arm 48 is along a 17° radial and the valve spool 51 is in the blocking position of FIG. 5, releasing the brakes and permitting the vehicle to be operated at whatever setting has been selected by the forward, neutral and reverse lever 32. The valve spool 51 blocks the pilot pressure to the reservoir 70, thereby directing the pilot pressure to valve 74 and thus directing the pressure to the brake actuating mechanism to compress the Belleville springs maintaining the brakes 78 in a released mode.

Depressing the pedal 34 to move the axis of the lever arm 48 through the 11° radial to the 0° radial will demodulate the effective settings of the speed and direction control 32 so that at the 0° radial, the effect the control 32 will have on the vehicle speed will be reduced to zero. Continued depressing of the pedal 34 will move the axis of the lever arm 48 of the −5° radial position which will rotate the spool 51 to a position to vent pilot pressure through orifice 66 to reservoir 70. With no pressure in branch line 72, valve 74 shifts to the left venting the pressure in the brake actuator to a reservoir 84 so that the Belleville springs will re-apply the brakes. The pedal 34 can be further depressed to move the axis of the lever arm 48 to the −10° radial. The movement of the brake actuating means has an overtravel from the −5° to the −10° setting to allow for stop and linkage tolerance. Removing the foot from the pedal 34 will permit the springs 43 to rotate the pedal 34 in a clockwise direction whereupon the lever arm 48 will rotate the valve spool 51 counterclockwise to a position to permit fluid to pressurize the brake actuating means so that the Belleville springs will be compressed releasing the brakes. The position shown by the dashed lines indicated with "a" numerals is that of brake pedal 34 fully depressed for full stop during normal operation. In this position, the rod 44 pulls the lever arm 48a to any brake applied position between the −5° and the −10° radial.

When it is desired to inspect or repair the vehicle components beneath the operator's cab 12, the control linkage for the steering, the implements, and speed direction control are disconnected from the cab. The cab 12 may then be pivoted around the pivot 24 to the position shown by the dashed lines in FIG. 3 with the platform indicated by the numerals 14b. It is anticipated that the maximum tilt of the cab would be approximately 25°. In the 25° position of tilt of the cab, the brake pedal 34b will have moved the lever arm 40b and rod 44b (represented by a dashed line) to a position that will have pivoted the brake lever arm 48b in a counterclockwise direction from the 17° radial position to a 60° radial position. When the cab 12 and platform 14 have been pivoted approximately 2° to 3° from the initial cab operating position, the lever arm 48 will have rotated spool 51 counterclockwise to a position which aligns orifice 68 in the spool with passages 62 and 64 of valve 50 venting pilot pressure to reservoir 70. In the absence of pilot pressure, valve 74 shifts to the left, venting the brakes to reservoir 84 and permits the Belleville springs to set the brake. At the approximate 10° tilt position of the cab and platform, depressing the pedal 34 will no longer move the lever arm 48 an amount sufficient to release the brake 78. That is, from approximately the 10° tilt position to the 25° tilt position of the cab, the lever arm 48 moves the valve spool 51 only in the range with the orifice 68 aligned with the pilot pressure passage 62 and reservoir 70 so that no pilot pressure is on valve 74 whereupon the spring moves the valve 74 to the left, vents the brake 78 to reservoir 84 and applies the brakes to the vehicle. At no point between the 10° and 25° tilt position of the cab and platform will depressing the pedal 34 release the brake. The valve 50 is vented from the 23° radial position all the way to the 60° radial position which means that the brake will be set throughout that range.

It is to be understood that the number of degrees specified in the one illustrated embodiment is operative for that particular size linkage and valve. Different radial positions will be operative for different sized vehicles without departing from the invention. It is important to recognize that in a normal use mode, a linkage moves in one direction to actuate the brakes, and in a service use mode, the same linkage moves in the opposite direction to also actuate the brakes.

The brake actuating means described above permits conventional application of brakes during vehicle operation and automatically applies the brake when the cab is tilted. This allows maintenance on components beneath the cab to be performed with the engine operating.

Other aspects, objects and advantages of this invention can be obtained from a study of the drawings, the disclosure and the appended claims.

I claim:

1. In a brake operating apparatus for a vehicle having a cab (12) tiltably mounted on a frame (22), comprising:
   a support (36) connected to said cab (12),
   a pedal (34) pivotally mounted on said support (36), said pedal (34) being adapted to move with the cab (12),
   a brake actuating element (50) connected to said frame (22), and
   means (44,40,48) for connecting said pedal (34) to said actuating element (50), said means (40,44,48) being adapted to move said brake actuating element (50) to a brake applying position in response to said cab (12) being moved to the tilted position.

2. In the apparatus as claimed in claim 1 wherein said means (44,40,48) for connecting said pedal (34) to said actuating element (50) comprises a lever (40) pivotally mounted on said support (36) for movement with said pedal (34), a rod (44) connected with said lever (40), and an operating lever (48) connected with said rod (44) and operatively connected with said brake actuating element (50).

3. In the apparatus as claimed in claim 2 wherein adjusting means (42,46) are provided on said rod (44) for adjustably connecting said rod (44) to said levers (40,48).

4. In the apparatus as claimed in claim 3 wherein said rod (44) is connected to said brake actuating element (50) for holding the brake disengaged during normal vehicle operation when said pedal (34) is not depressed.

5. In the apparatus as claimed in claim 4 wherein said brake actuating element (50) is controlled by rotation of said operating lever (48) attached to the one end of said rod (44).

6. In a brake operating apparatus for a vehicle having a cab (12) tiltably mounted on a frame (22), said apparatus comprising:
   a support (36) carried by a platform (14) of said cab (12),
   a pedal (34) pivotally mounted on a pivot rod (37) carried by said support (36),
   a lever (40) pivotally mounted on said pivot rod (37) for movement with said pedal (34),
   a brake on said vehicle,
   brake actuating means (50) carried by said frame (22) for operating said brake,
   an operating lever (48) mounted on said brake actuating means (50), and
   means (44) for connecting said lever (40) to said operating lever (48), said lever (40) and said connecting means (44) moving with said cab (12) as said cab is tilted to move said operating lever (48) to actuate said brake actuating means (50) to set said brake.

7. In a brake operating apparatus as claimed in claim 6 wherein said brake actuating means (50) comprises:
   a valve (50) having a passage (62) connected to a source of pilot pressure, a reservoir (70) connected to said valve, a valve spool (51) connected with said operating lever (48) and having an orifice (66,68) that may alternately connect and block said passage (62) from the source of pilot pressure to said reservoir,
   a second valve (74) connected with said passage (62) from the source of pilot pressure, a spring (76) on said second valve (74) depressed by pressure from said source of pilot pressure to permit separate pressure fluid to release said brake when said operating lever (48) moves said valve spool (51) to block the passage (62) between the pilot pressure and the reservoir (70) and wherein when said operating lever (48) moves said valve spool (51) to a position to connect said source of pilot pressure to said reservoir, the spring moves the second valve to vent the brake whereupon the brake is applied.

8. In the apparatus as claimed in claim 7 wherein said pedal (34) is positioned so that when the cab (12) is tilted approximately 20°, said brake actuating means (50) permits the brakes to be engaged and when said cab (12) is tilted more than 10°, the brakes cannot be disengaged.

9. In a brake operating apparatus having an operator's cab (12) pivotally mounted on a frame (22), the improvement comprising:
   a hydraulic power control unit (50) mounted on said frame (22) for operative connection with a brake means;
   a pedal (34) pivotally mounted on a platform (14) of said cab (12); and
   means (40,44,48) connecting said pedal (34) and said control unit to actuate said brake means on said vehicle during vehicle operation when said pedal (34) is depressed and during maintenance when said cab (12) is tilted.

10. In the apparatus as claimed in claim 9 wherein said means connecting said pedal (34) and control unit (50) comprises:
    a support (36) for pivotally supporting said pedal (34) on said platform (14);
    a first lever arm (40) connected with said pedal to pivot with said pedal (34);
    a rod (44) connected with said first lever arm (40); and a second lever arm (48) controlling said control unit (50) and connected with said rod (44) at a location spaced from said first lever arm (40) connection.

11. In the apparatus as claimed in claim 10 wherein depressing said pedal (34) during normal vehicle operation pivots said second lever arm (48) in a first direction to vent said brake means and to set a brake controlled by said brake means.

12. In the apparatus as claimed in claim 11 wherein said second lever arm (48) pivots in a second direction opposite said first direction to vent said brake means and to set said brake when said cab (12) is tilted.

13. In the apparatus as claimed in claim 12 wherein said brake means is in a vent position to actuate the brake when said cab (12) is tilted approximately in the range of 2°–3.3°.

14. In a brake operating apparatus for a vehicle having a cab (12) tiltably mounted on a frame (22), said apparatus comprising:
   a support (36) carried by said cab (12),
   a pedal (34) pivotally mounted on said support (36),
   brake actuating means (50) carried by said frame (22),
   means (44,40,48) connecting said pedal (34) to said actuating means (50) comprising a lever (40) pivotally mounted on said support (36) for movement with said pedal (34), an operating lever (48) mounted on said brake actuating means (50), and a rod (44) connecting said lever (40) and said pedal (34) to said operating lever (48) and said brake actuating means (50), said cab being tilted to move said brake actuating means (50) to a brake applying position,
   adjusting means (42,46) for adjustably connecting said connecting means (44) to said levers (40,48),
   said means (44,40,48) for connecting said pedal to said brake actuating means (50) holding the brake disengaged during normal vehicle operation when said pedal (34) is not depressed,
   said brake actuating means (50) being controlled by rotation of said operating lever (48) attached to the one end of said rod (44), and
   said brake actuating means (50) comprising a hydraulic power control unit with a valve spool (51) rotated by said operating lever (48).

* * * * *